United States Patent [19]

Lim

[11] Patent Number: 5,748,674
[45] Date of Patent: May 5, 1998

[54] DECISION-FEEDBACK EQUALIZER FOR DIGITAL COMMUNICATION SYSTEM

[75] Inventor: Il-Taek Lim, Seoul, Rep. of Korea

[73] Assignee: LG Semicon Co., Ltd., Choongcheongbuk-Do, Rep. of Korea

[21] Appl. No.: 639,924

[22] Filed: Apr. 26, 1996

[30] Foreign Application Priority Data

Apr. 28, 1995 [KR] Rep. of Korea ............... 10318/1995

[51] Int. Cl.$^6$ .................. H03H 7/30; H03K 5/159; H04B 1/10
[52] U.S. Cl. ........................ 375/233; 375/348
[58] Field of Search ...................... 375/233, 232, 375/230, 348, 350, 346, 229; 364/724.19, 724.2; 333/18

[56] References Cited

U.S. PATENT DOCUMENTS

| | | | |
|---|---|---|---|
| 5,031,194 | 7/1991 | Crespo et al. | 375/233 |
| 5,293,402 | 3/1994 | Crespo et al. | 375/233 |
| 5,345,476 | 9/1994 | Tsujimoto | 375/233 |
| 5,471,504 | 11/1995 | Lee et al. | 375/233 |

Primary Examiner—Stephen Chin
Assistant Examiner—Betsy L. Deppe

[57] ABSTRACT

An improved decision-feedback equalizer for a digital communication system, which is capable of preventing performance degradation which occurs due to a pipelining delay, includes a feed forward filter, a subtractor, a slicer, first and second feedback filters, and an adder. The feed forward filter filters out a precursor ISI signal from a digital signal. The subtractor subtracts a summation ISI signal from the digital signal output by the feed forward filter, and the slicer slices the output of the subtractor into symbols having a predetermined size. The first feedback filter has a predetermined number of pipelining delays, and filters the output from the slicer to generate a first post-cursor ISI signal. The second feedback filter also filters the output of the slicer to generate a second post-cursor ISI signal within the predetermined pipelining delay number of the first feedback filter without a pipelining delay. The adder adds the first and second post-cursor ISI signals to generate the summation ISI signal.

7 Claims, 4 Drawing Sheets

DECISION-FEEDBACK EQUALIZER FOR DIGITAL COMMUNICATION SYSTEM

BACKGROUND OF THE INVENTION

1. Field of the Invention

The present invention relates to a decision-feedback equalizer for a digital communication system, and particularly to an improved decision-feedback equalizer for a digital communication system, which is capable of improving system performance by filtering a post-cursor ISI signal within a predetermined order, which is not filtered by a pipelining delay, when filtering an inter-symbol interference (ISI) signal, which occurs when a transfer channel is unstable.

2. Description of the Conventional Art

In a conventional digital communication system, a digital signal (symbol) is classified as a main signal which is directly transferred to a receiving terminal, a post-cursor ISI signal, which is reflected by a predetermined reflective matter and then arrives later thank the main symbol, and a pre-cursor ISI signal, which arrives earlier than the main signal under a certain atmospheric condition, or a signal receiving angle of an antenna.

Therefore, the signal receiving terminal is directed to mainly obtaining a main signal by receiving a main signal, a pre-cursor ISI signal, and a post-cursor ISI signal. Here, a decision-feedback equalizer is generally used as a means for filtering a pre-cursor ISI signal and a post-cursor ISI signal.

In addition, when assuming that there is n-number of transfer channels (as a reflection path) with respect to a main signal outputted from the transmission terminal, the main signal is changed to a post-cursor ISI signal having a predetermined delay rate by the n-number of transfer channels. Also, the post-cursor ISI signal arriving at the receiving terminal is inputted thereto after a maximum delay of $D_N$.

Referring to FIG. 1, when modeling the above descriptions as a circuit construction, there are provided a multiplier unit 1 having a plurality of multipliers with predetermined multiplication factors size of a1, a2, a3, ..., aN, a delay unit 2 having a plurality of delay units with predetermined delay rates of D1, D2, D3, ..., $D_N$, and an adder 3 for adding an output of the delay unit 2 and a main signal X(n).

Accordingly, assuming the main signal outputted from the transmission terminal is X(n) and the post-cursor ISI signal, which is delayed by the n-number of transmission channels, is ISI(n), the digital signal Y(n) inputted to the receiving terminal becomes "X(n)+ISI(n)".

Therefore, the receiving terminal has the feedback filters with the construction as shown in FIG. 1 for operating the ISI(n) having predetermined delay rates of D1, D2, D3, ... , DN and predetermined multipliers of a1, a2, a3, ..., aN in cooperation with the feedback filter, and the main signal X(n) us obtained by subtracting the ISI(n) from Y(n).

Referring to FIG. 2, the conventional ideal decision-feedback equalizer includes a feedforward filter 10 for filtering a pre-cursor ISI signal from the received digital signal, a subtractor 20 for subtracting a post-cursor ISI signal from the output of the feedforward filter 10, a slicer 30 for slicing output of the subtractor 20 into a predetermined symbol, and a feedback filter 40 for changing an output of the slicer 30 to a post-cursor ISI signal which is feedback to the subtractor 20.

Here, the feedback filter 40 includes a multiplier unit 1 having a plurality of mulipliers with a predetermined multiplication factors of a1, a2, a3, ..., aN, and a delay unit 2 having a plurality of delay units with a predetermined delay rates of D1, D2, D3, ..., $D_N$.

The operation of the convention ideal decision-feedback equalizer will now be explained with reference to the accompanying drawings.

To begin with, when a digital signal outputted from the transmission terminal is received, the feedforward filter 10 filters a pre-cursor ISI signal from the digital signal inputted thereto, and the subtractor 20 received an output of the feedforward filter 10, in which a main signal and a post-cursor ISI are contained, and a post-cursor ISI signal from the feedback filter 40. The subtractor 20 subtracts the post-cursor ISI signal, and then outputs only a main signal to the slicer 30.

Therefore, the slicer 30 received a main signal from the subtractor 20, slices it into a predetermined size or symbol, and then outputs the symbol.

However, as the symbol transfer rate (symbol/s) of the digital signal is increased, the need for a high speed feedforward filter 10 and feedback filter 40 increases, so that a higher order filter is generally used.

For example, in the high definition television ATV of the US Grand Alliance method having symbol transfer rate of 10.76 Mhz, a 64th order the feedforward filter 10 and an 192nd order of feedback filter 40 are needed.

Here, in the ideal decision-feedback equalizer, since the order of the feedback filter 40 is relatively high, the chip size is made larger.

In addition, when the feedback filter 40 has a 192nd order, the number to taps becomes 192, and the computational burden becomes more severe although the operation is performed by combining the 192 taps by two (2) taps.

Therefore, in order to reduce the size of the feedback filter 40, a multiplexing technique is used in the industry. The typical example of the same is shown in FIG. 3.

The case that the high order feedback filter 40 has a 288th order, and the number of taps is 28 will now be explained.

That is, when the symbols outputted from the slicer 30 and having a symbol transfer Ts of 10 Mhz is inputted to each tap of the feedback filter 40, the multiplier 11 multiplexes symbols inputted to the 288 taps from the leftside to the rightside in accordance with a clock signal Tc.

In addition, the number (n) of the multiplexings is determined in accordance with an expression of "n=Tc/Ts". For example, when the number (n) of the multiplexings is 4, the clock signal Tc becomes 40 Mhz. That is, in order to obtain one output by operating the symbols of 288 taps, 72 (=288/4) multipliers are necessary.

Therefore, the multiplier 11 multiplexes the symbols of the 288 taps while moving from leftside to rightside in accordance with a clock signal Tc of 40 Mhz in the first stage, and thusly multiplexed symbols are summed, and temporarily stored. In the drawings, reference numeral 12 denotes an accumulator, reference 13 denotes an adder, and reference numeral 14 denotes a storing unit.

However, in accordance with the multiplexing technique, which is used in order to reduce the size of the high order feedback filter 40, as the number (n) of the multiplexings is increased or as the clock Tc is small, the speed is improved. Also, it is necessary to obtain a constant number of the multiplexing based on the size of the feedback filer 40, so that it is the clock cycle Tc that decides the speed of the feedback filter 40.

At this time, since the accumulator 12 is generally operated in an adder-tree form, when the output of seventy two

(72) multipliers 11 is adapted as an input of the adder tree, as shown in FIG. 4, the stages of the adder-tree becomes 7.

In addition, in order to improve the speed of the feedback filter 40, when reducing the clock cycle Tc, it is necessary to insert a delay element, for delaying by "T", so that one stage of seven stages can form a critical path, and then a pipelining operation is performed.

In a feedback filer 40 having a higher speed and higher order, pipelining is a more important.

However, when performing a pipelining operation in order to reduce the formation of the critical path, the pipelining delay inevitably occurs due to the delay elements contained in the system, and the pipelining delay is within a range of an 8th order when forming the feedback filter 40 having a 288th order.

As the equivalent model of the decision-feedback equalizer based on the pipelining delay is shown as feedback filter 50 in FIG. 5. The feedback filter 50 is obtained by providing a delay unit 50b after the ideal feedback filter 50a (the ideal feedback filter 50a being the same as ideal feedback filter 40), as shown in FIG. 5. Here, "L" denotes the order of the pipelining delay.

That is, when the pipelining delay occurs in the ideal feedback filter 50a, it is equivalent that the symbol outputted from the slicer 30 is operated by the ideal feedback filter 50a, and then is delayed by n-order by the delay 50b as shown in FIG. 5.

At this time, there is no method for filtering the post-cursor ISI signal.

Therefore, the performance of the feedback filter 50 is greatly decreased due to the pipelining delay.

In addition, in order to compensate for the poor performance of the feedback filter 50, a method of somewhat filtering the post-cursor ISI signals within an "L"-order is introduced. Also, the post-cursor ISI signals are disadvantageously amplified by the feedforward filter 10, and when the post-cursor ISI signals are almost equal to the main signal, it is difficult to filter the post-cursor ISI signal.

SUMMARY OF THE INVENTION

Accordingly, it is an object of the present invention to provide a decision-feedback equalizer for a digital communication system which overcomes the problems encountered in the conventional decision-feedback equalizer for a digital communication system.

It is another object of the present invention to provide a decision-feedback equalizer for a digital communication system, which is capable of preventing performance degradation of the system which occurs due to a pipelining delay by filtering in parallel using a first feedback filter in which a pipelining delay occurs and a second feedback filter in which a pipelining delay does not occur, and by filtering an ISI signal which the first feedback filter does not filter.

To achieve the above objects, there is provided a decision-feedback equalizer for a digital communication system having a subtractor for subtracting a post-cursor ISI signal from a digital signal inputted thereto and a slicer for slicing an output of the subtractor into a predetermined size of symbol, said decision-feedback equalizer comprising: a first feedback filter filtering output from the slicer, and outputting a first post-cursor ISI signal having a predetermined number of pipelining delays; a second feedback filter filtering the output from the slicer, and outputting a second post-cursor ISI signal within a predetermined pipelining delay number of the first feedback filter without a pipelining delay; and an adder adding the first and second post-cursor ISI signals to produce a summation ISI signal, and outputting the summation ISI signal to the subtractor.

DETAILED DESCRIPTION OF THE INVENTION

Figure 1:
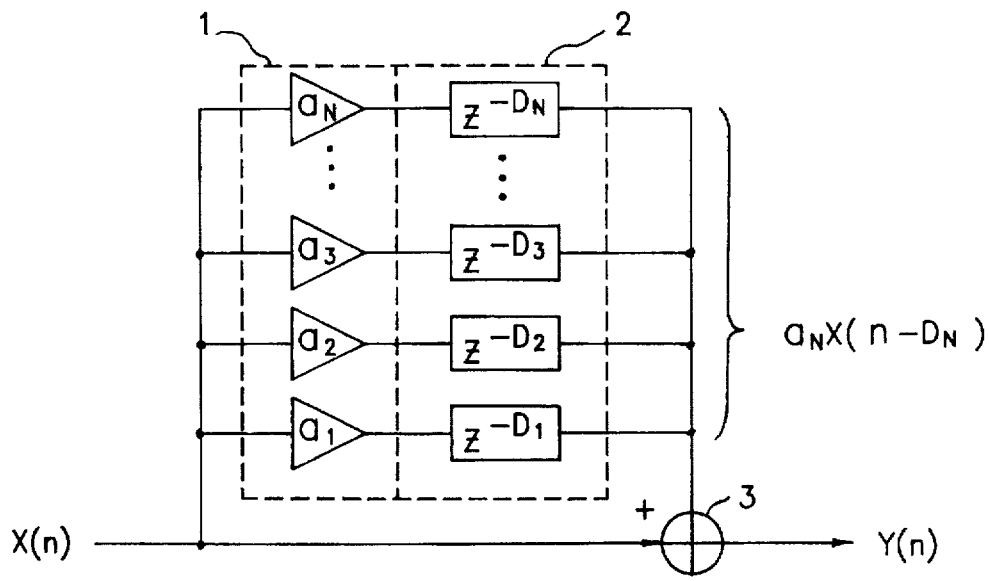
FIG. 1 is a circuit diagram of a post-cursor ISI which occurs due to an unstable transfer channel.
Figure 2:
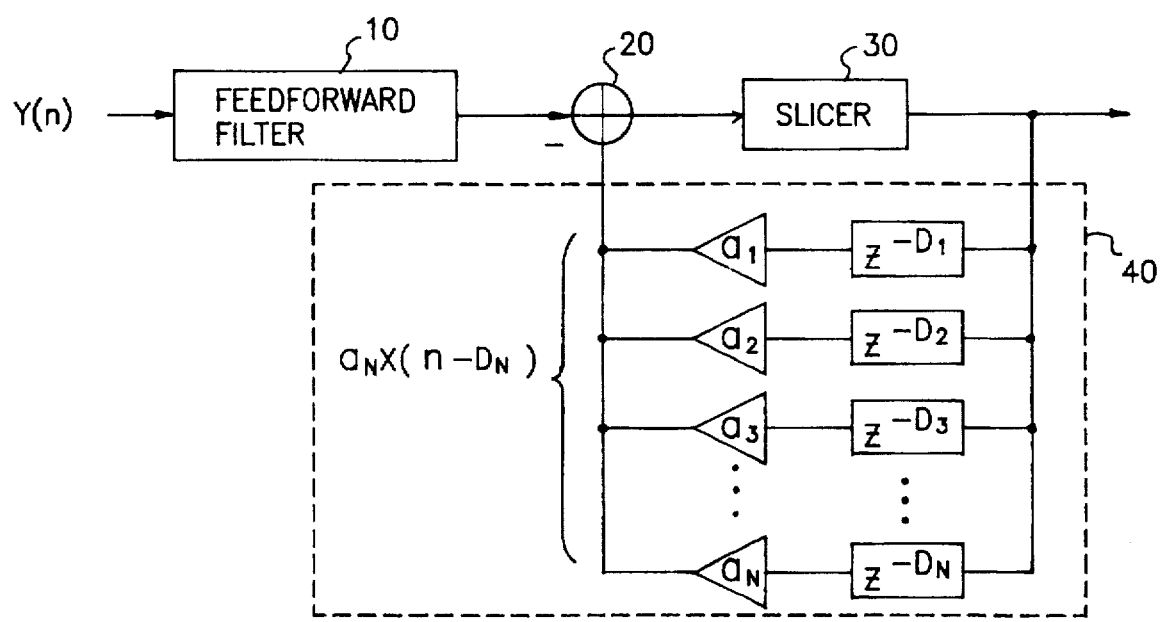
FIG. 2 is a block diagram of a conventional ideal decision-feedback equalizer.
Figure 3:
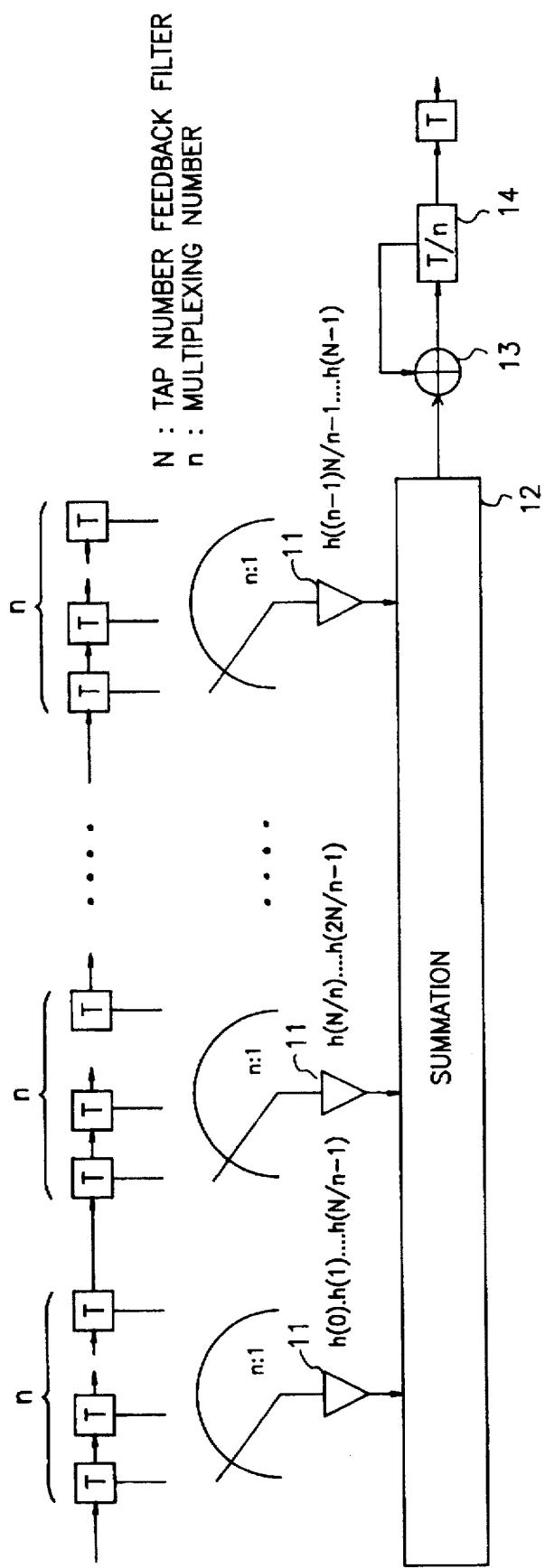
FIG. 3 is a block diagram of the construction of a multiplexer adapted for an operation of a conventional feedback filter so as to show the technique of multiplexing.
Figure 4:
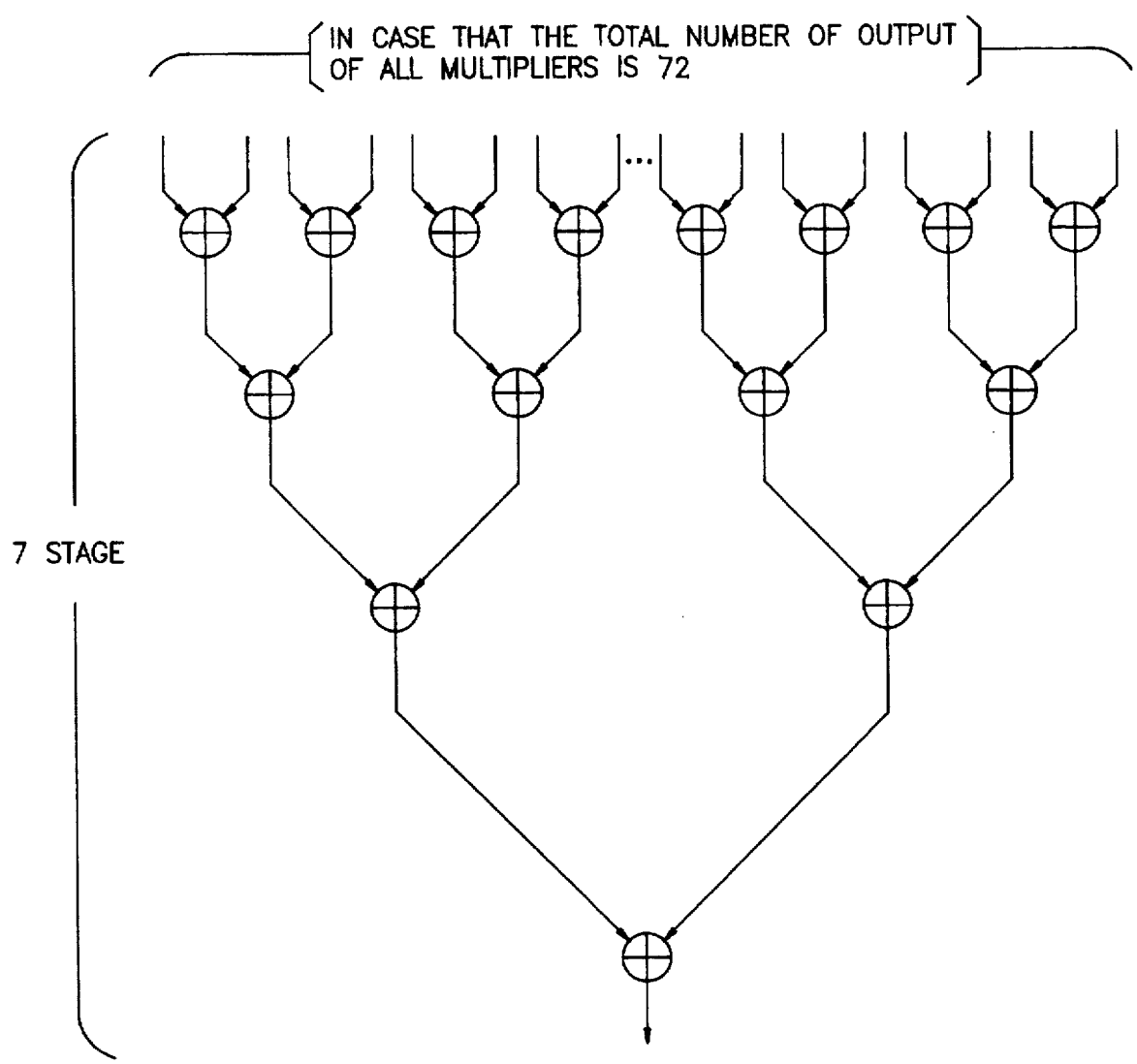
FIG. 4 is a diagram showing the number of stages of an adder-tree when the total number of outputs of all multipliers is 72.
Figure 5:
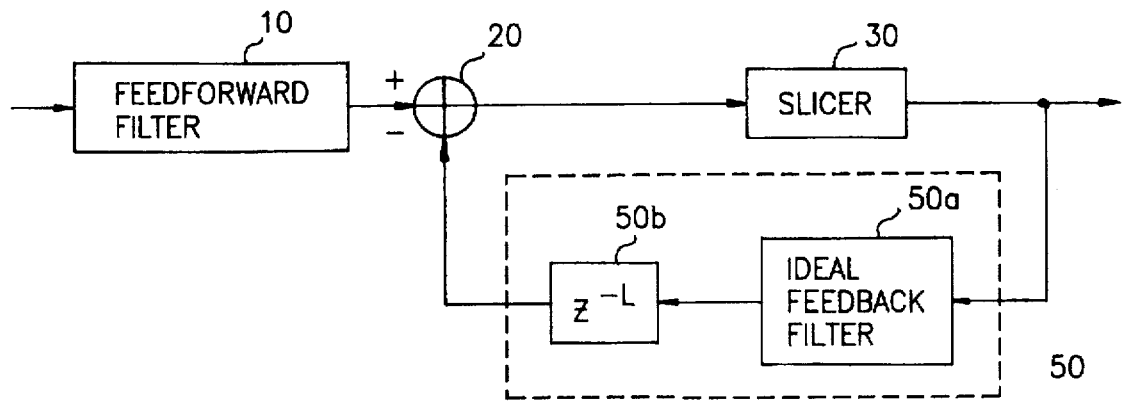
FIG. 5 is a block diagram of a conventional decision-feedback equalizer having a pipelining delay.
Figure 6:
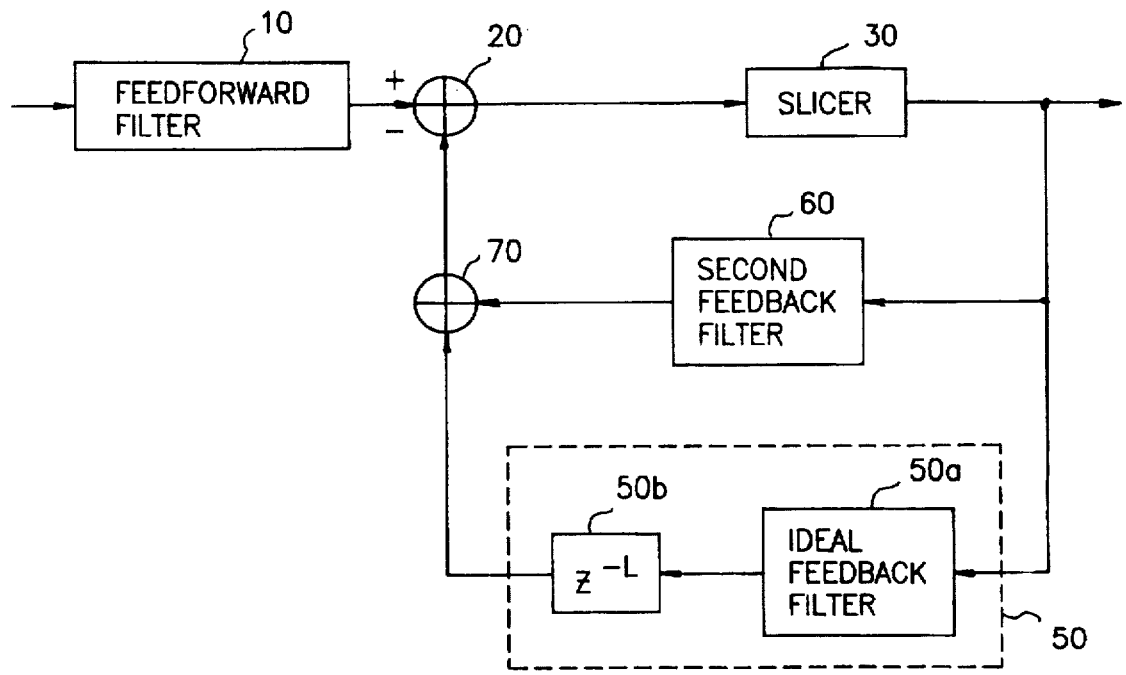
FIG. 6 is a block diagram of a decision-feedback equalizer according to the present invention.

Referring to FIG. 6, a decision-feedback equalizer for a digital communication system according to the present invention includes a feedforward filter 10 for filtering a pre-cursor ISI signal from a digital signal inputted thereto, a subtractor 20 for subtracting a post-cursor ISI signal form the inputted digital signal, a slicer 30 for slicing an output of the subtractor 20 into a predetermined size of symbol, a first feedback filter 50 for outputting a post-cursor ISI signal having a pipelining delay of a predetermined order based on output of the slicer 30, a second feedback filter 60 for outputting a post-cursor ISI signal within a pipelining delay order based on output of the slicer 30, and an adder 70 for adding post-cursor ISI signals outputted from the first feedback filter 50 and the second feedback filter 60 and then for outputting the resulting signal to the subtractor 20.

The feedforward filter 10 server to filter the pre-cursor ISI signal as in the conventional art; however, since the amount of the pre-cursor ISI signal is small, feedforward filter 10 can be omitted.

In addition, the first feedback filter 50 includes an ideal feedback filter 50a and a delay unit 50b for delaying an output of the feedback filter 50a by a predetermined order "L". Here, the number of taps of the second feedback filter 60 is the same as the pipelining delay order (number) of the first feedback filter 50.

The operation of the decision-feedback equalizer of a digital communication system according to the present invention will now be explained with reference to the accompanying drawings.

To begin with, when a digital signal outputted from the transmission terminal is inputted, the feedforward filter 10 filters a pre-cursor ISI signal from the inputted digital signal, and outputs a digital signal, in which a main signal and a post-cursor ISI signal are contained, to the subtractor 20.

In addition, the first feedback filter 50 received a predetermined symbol outputted from the slicer 30, and outputs a post-cursor ISI signal with a pipelining delay have a predetermined order (number). The second feedback filter 60 also received the predetermined symbol, and outputs a post-cursor ISI signal within the predetermined pipelining delay order outputted from the first feedback filter 50.

Preferably, the first feedback filter 50 is within the 10th order when the order of the filter of the first feedback filter 50 is within a few hundreds order.

In addition, since the number of taps of the second feedback filter 60 is the same as the order (number) of the pipelining delay order of the first feedback filter 50, when the pipelining delay order (number) of the first feedback filter 50 is, for example, 4, and the number of taps of the second feedback filter 60 is 4. Accordingly, the first feedback filter 50 outputs a post-cursor ISI signal after a 4th order, and the second feedback filter 60 outputs a post-cursor ISI signal with 4th order. At this time, in the post-cursor ISI signal after 4th order outputted from the second feedback filter 60, the pipelining delay does not occur.

The adder 70 received the post-cursor ISI signal after 4th order in which a pipelining delay occurs from the first feedback filter 50 and the post-cursor ISI signal within 4th order in which the pipelining delay does not occur by the second feedback filter 60, adds two post-cursor ISI signals, and then outputs the result to the subtractor 20.

Therefore, the subtractor 20 received a digital signal, in which the main signal and the post-cursor ISI are contained, received the post-cursor ISI signal from the adder 70, subtracts the post-cursor ISI signal from the digital signal, in which a main signal and a post-cursor ISI are contained, and outputs only the main signal to the slicer 30 so that the post-cursor ISI signal which was not filtered by the pipelining delay is filtered. Thus it is possible to obtain the same performance as the decision-feedback equalizer without the pipelining delay.

Thereafter, the slicer 30 receives a main signal from the subtractor 20, and slices it into a predetermined size of symbol.

As described above, the decision-feedback equalizer for a digital communication system is directed to preventing performance degradation of the system which occurs due to a pipelining delay by filtering in parallel using a first feedback filter in which a pipelining delay occurs and a second feedback filter in which a pipelining delay does not occur, and by filtering an ISI signal which the first feedback filter does not filter when filtering a post-cursor ISI signal using a second feedback filter.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A decision-feedback equalizer having a subtractor for subtracting a summation of post-cursor ISI signals from a digital signal inputted thereto, and a slicer for slicing an output of the subtractor into a predetermined size of symbol, said decision-feedback equalizer comprising:

a first feedback filter, having a predetermined number of pipelining delays, for filtering output from the slicer, and for outputting a first post-cursor ISI signal;

a second feedback filter for filtering the output from the slicer, and for outputting a second post-cursor ISI signal within the predetermined pipelining delay number of the first feedback filter without a pipelining delay; and an adder for adding the first and second post-cursor ISI signals to produce the summation ISI signal, and for outputting the summation ISI signal to the subtractor.

2. The decision-feedback equalizer of claim 1, wherein a number of taps of said second feedback filter is the same as the predetermined number of pipelining delays of the first feedback filter.

3. The decision-feedback equalizer of claim 2, further comprising:

a feedforward filter filtering out a pre-cursor ISI signal from the digital signal, and outputting the filtered digital signal to the subtractor.

4. A decision-feedback equalizer, comprising:

a subtractor for subtracting a summation of post-cursor ISI signals from a digital signal inputted thereto;

a slicer for slicing an output of the subtractor into a predetermined size of symbol;

a first feedback filter, having a predetermined number of pipelining delays, for filtering output from the slicer, and for outputting a first post-cursor ISI signal;

a second feedback filter for filtering the output from the slicer, and for outputting a second post-cursor ISI signal within the predetermined pipelining delay number of the first feedback filter without a pipelining delay; and an adder for adding the first and second post-cursor ISI signals to produce the summation ISI signal, and for outputting the summation ISI signal to the subtractor.

5. A method of performing a decision-feedback equalization, comprising:

(a) subtracting a summation of post-cursor ISI signals from a digital signal using a subtractor;

(b) slicing an output of step (a) into a predetermined size of symbol;

(c) filtering output from step (b) to generate a first post-cursor ISI signal using a first filter having a predetermined number of pipelining delays;

(d) filtering, using a second filter, the output from step (b) to generate a second post-cursor ISI signal within the predetermined pipelining delay number of the first filter without a pipelining delay;

(e) adding the first and second post-cursor ISI signals to generate the summation ISI signal; and (f) outputting the summation ISI signal to the subtractor.

6. The method of claim 5, wherein a number of taps of the second filter is the same as the number of pipelining delays of the first filter.

7. The method of claim 6, further comprising, prior to the step (a):

filtering out the pre-cursor ISI signal from the digital signal.

* * * * *